United States Patent
Dorato et al.

(10) Patent No.: US 10,822,445 B2
(45) Date of Patent: Nov. 3, 2020

(54) PROCESS FOR THE CONTINUOUS POLYMERIZATION OF A DIENE ELASTOMER

(71) Applicant: COMPAGNIE GENERALE DES ETABLISSEMENTS MICHELIN, Clermont-Ferrand (FR)

(72) Inventors: Margarita Dorato, Clermont-Ferrand (FR); Lionel Flesinski, Clermont-Ferrand (FR); Pierre Kiener, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 319 days.

(21) Appl. No.: 15/735,406

(22) PCT Filed: Jun. 17, 2016

(86) PCT No.: PCT/EP2016/064051
§ 371 (c)(1),
(2) Date: Dec. 11, 2017

(87) PCT Pub. No.: WO2016/203000
PCT Pub. Date: Dec. 22, 2016

(65) Prior Publication Data
US 2018/0134830 A1    May 17, 2018

(30) Foreign Application Priority Data
Jun. 17, 2015 (FR) ..................... 15 55545

(51) Int. Cl.
| | | |
|---|---|---|
| *C08F 236/10* | (2006.01) | |
| *B01J 19/18* | (2006.01) | |
| *B01J 19/00* | (2006.01) | |
| *C08F 2/00* | (2006.01) | |
| *C08F 4/48* | (2006.01) | |
| *C08F 2/06* | (2006.01) | |

(52) U.S. Cl.
CPC .......... *C08F 236/10* (2013.01); *B01J 19/0066* (2013.01); *B01J 19/1862* (2013.01); *C08F 2/001* (2013.01); *C08F 2/06* (2013.01); *C08F 4/48* (2013.01); *C08F 2800/20* (2013.01)

(58) Field of Classification Search
CPC . C08F 236/10; C08F 2800/20; B01J 19/0066; B01J 19/1862
See application file for complete search history.

(56) References Cited

U.S. PATENT DOCUMENTS

| | | | |
|---|---|---|---|
| 2013/0090440 A1 | 4/2013 | Valenti et al. | |
| 2015/0086735 A1* | 3/2015 | Valenti ................... | C08F 36/06 428/36.9 |

FOREIGN PATENT DOCUMENTS

WO    2016001372 A1    1/2016

OTHER PUBLICATIONS

International Search Report for PCT/EP2016/064051 dated Sep. 23, 2016.

* cited by examiner

*Primary Examiner* — Robert D Harlan
(74) *Attorney, Agent, or Firm* — Dickinson Wright PLLC

(57) ABSTRACT

A process for the continuous synthesis of a diene elastomer by n reactors r1 to rn, n ranging from 2 to 15, is provided. The reactor r1 is fed by an input solution comprising a solvent, one or more monomers, an anionic polymerization initiator and a polar agent, one or more of the reactor(s) r2 to rn also being fed by reinjection of a purified solution comprising solvent and/or monomer(s), the purity of the or of each reinjected solution being such that the proportion of the number of dead chains in the output stream from the reactor rn is less than 30%, of the number of living chains initiated in the reactor r1, the temperature of each reactor ranging from 20 to 150° C. and being greater than or equal to the temperature of the reactor which immediately precedes it, the diene elastomer having a polydispersity index of 1.1 to 2.

18 Claims, No Drawings

PROCESS FOR THE CONTINUOUS POLYMERIZATION OF A DIENE ELASTOMER

This application is a 371 national phase entry of PCT/EP2016/064051, filed 17 Jun. 2016, which claims benefit of French Patent Application No. 1555545, filed 17 Jun. 2015, the entire contents of which are incorporated herein by reference for all purposes.

BACKGROUND

1. Technical Field

The present invention relates to a process for the continuous synthesis, by means of several reactors in series, of a diene elastomer having a narrow molecular weight distribution.

2. Related Art

Now that savings in fuel and the need to protect the environment have become a priority, it is desirable to produce polymers having good mechanical properties and a hysteresis which is as low as possible in order to be able to process them in the form of rubber compositions which can be used in the manufacture of various semi-finished products participating in the constitution of tire casings, such as, for example, underlayers, bonding rubbers between rubbers of different natures or coating rubbers for metal or textile reinforcing elements, sidewall rubbers or treads, and to obtain tires having improved properties, in particular having a reduced rolling resistance.

The reduction in the hysteresis of the mixtures is an ongoing objective of the tire industry in order to limit fuel consumption and to thus protect the environment. This must, however, be carried out while keeping intact the processability of the mixtures.

Many solutions have already been experimented with in order to achieve the objective of a fall in hysteresis. Mention may in particular be made of the modification of the structure of diene polymers and copolymers at the end of polymerization by means of functionalization agents, coupling agents or star-branching agents with the aim of obtaining a good interaction between the polymer, thus modified, and the filler, whether this is carbon black or a reinforcing inorganic filler.

The reduction in molecular weight distribution before functionalization of the elastomer also makes it possible to improve the hysteresis/processing compromise of the material.

The synthesis of the elastomers with a process of batch type is preferable in this regard, since this type of process makes it possible to control the molecular distribution in order to obtain diene copolymers with a narrow molecular weight distribution before functionalization, unlike a continuous process which provides a wide molecular weight distribution.

By way of example, mention may be made of patents U.S. Pat. No. 6,313,232, EP 1318172 and EP 1 829 906 which confirm that products having a low polydispersity are favourable to reduced hysteresis. Linear polymers with narrow molecular distributions also exhibit improved processing.

U.S. Pat. No. 5,587,420 describes a method for the polymerization of diene monomers in solution in hydrocarbon-based solvent using an organolithium compound as initiator, batchwise. An organotin compound is added during or at the end of the batch. This type of batch process is less productive and less economical than a continuous process. This is described in U.S. Pat. No. 6,313,232 which describes a continuous process with a first step of polymerization in the presence of a tin-derived compound, followed by a step of functionalization with tin at the output of the production reactor of a diene polymer with improved physical properties, including reduced hysteresis. However, the polydispersity values of polymers synthesized with this method are not indicated.

Moreover, in order for it to be possible for the polymer obtained to be exploited, the synthesis process must be competitive and economical. In this sense, a process of continuous type is preferable. However, this type of process with a perfectly stirred reactor does not make it possible to control the polydispersity index like processes of batch type.

Many patents describe the synthesis of functional elastomers in a continuous process. Mention may be made of patent JP 1988-235305 (63-235305JP), which describes an economical continuous polymerization process in which the polymer obtained has a wide molecular distribution.

The objective of the invention is thus to find an economical continuous process capable of synthesizing diene elastomers with a low molecular weight distribution which makes it possible to obtain a gain in terms of the hysteresis/processing compromise of the material thus synthesized.

Patent EP 1 829 906 describes a continuous process for the production of diene/vinyl aromatic copolymers in the presence of a polarity-modifying agent (THFA-ethyl) in order to obtain a random incorporation of the monomers. The synthesis is carried out by means of at least two reactors in series. The copolymer obtained has a polydispersity index of between 1.6 and 2.5.

Mention may also be made of U.S. Pat. No. 6,372,863 B1 which describes a continuous process for the polymerization of styrene and butadiene in two reactors in series, according to which all of the styrene is introduced into the first reactor with only a part of the butadiene, the remainder of the butadiene being introduced into the second reactor. This process makes it possible to synthesize statistical elastomers having a low vinyl content with an absence of styrene blocks.

SUMMARY

The inventors have now discovered, surprisingly, that the objectives of the invention can be obtained by means of a continuous synthesis process comprising several reactors in series, the temperature of the final reactor being greater than the temperature of the first reactor, solvent and/or monomer being optionally reinjected into the reactors other than the first, at a purity and in proportions as defined hereinafter, the diene elastomer obtained having a polydispersity index ranging from 1.1 to 2 and a low dead chain content.

A subject of the invention is thus a process for the continuous synthesis of a diene elastomer by means of n reactors r1 to rn, equipped with an internal stirring system, assumed to be perfectly stirred, and arranged in series, n ranging from 2 to 15, preferably from 2 to 9, the reactor r1 being fed by an input solution comprising a solvent, one or more monomers, a polymerization initiator and a polar agent, one or more of the reactors r2 to rn also being fed by reinjection of a purified solution comprising solvent and/or monomer(s). The purity of the or each reinjected solution is such that the proportion of the number of dead chains in the output stream from the reactor rn is, relative to the number of significantly minimized living chains initiated in the reactor r1, less than 30%, preferably less than 10%. This is because the dead chain content contributes to the quality of the polydispersity index. The higher the dead chain content, the more its impact on the polydispersity index tends to increase the latter.

In the context of the present application, the term "reinjection" refers to the repeating of the action of injection into a reactor ri', different than the reactor r1, already fed by the stream from ri'−1. The reinjection can be carried out directly in one or more of the reactors, or, advantageously, by mixing with the stream from ri'−1. The reinjection can be carried out with streams having a composition that is identical to or different than the r1 feed stream. When the reinjection takes place in at least two reactors, the natures of these reinjections may be identical or different. The term "reinjected monomer" refers to the monomer injected into ri' which is not from the stream originating from ri'−1.

In the case of an anionic polymerization, the living chain is a carbanion. The carbanion is a very reactive species. It reacts with protic species or electrophilic species.

Thus, if the feedstock of the first reactor contains protic impurities (alcohols, water, acids, etc.) or electrophilic impurities (carbonyls, etc.), the initiator will first react with these impurities to produce inactive species (alkoxides) incapable of initiating the monomer polymerization. This is why the first reactor is fed by an input solution which comprises the monomers and the initiator. Thus, the initiator is brought into contact with all of the constituents of the input solution prior to their introduction into the reactor in order to neutralize the impurities. The difference between the amount of initiator introduced in the input solution of the reactor r1 and the amount of initiator having reacted with the impurities constitutes the amount of active initiator. The number of living chains initiated in the reactor r1 is equivalent to this amount of active initiator in the reactor r1.

On the other hand, for the subsequent reinjection(s) between the reactors, the neutralization of the impurities introduced by the reinjection will be carried out by the polymer carbanion present in these reactors. This neutralization prevents the polymer chain from propagating and the chain thus becomes dead. This species is no longer reactive with the optional stopping, functionalizing, coupling or star-branching agents.

Consequently, outside of the feedstock of the first reactor, it is necessary to control the purity of each reinjected solution in order to guarantee the lowest possible dead-polymer content at the output of the reactor rn, that is to say less than 30% by number, preferably less than 10% by number, relative to the total number of chains initiated in the reactor r1.

According to the invention, the temperature of each reactor ranges from 30 to 150° C. and is greater than or equal to the temperature of the reactor that immediately precedes it, the temperature of the reactor rn being greater than the temperature of the reactor r1.

According to the invention:
the weight amount $W_1$ of monomer(s) introduced into the reactor r1 is such that $$0.1 < \frac{W1}{\sum_{i=1}^{n} Wi} \leq 1$$

the weight amount $W_{i'}$ of monomer(s) reinjected into the reactor ri', when $W_{i'} \neq 0$, i' ranging from 2 to n, is such that $$0 \leq \frac{Wi'}{\sum_{1}^{n} Wi} < 0.9$$

and such that Wi' represents from 5% to 100% by weight of the weight of the solution reinjected into the reactor ri', when $W_{i'} \neq 0$,
where Wi is the weight amount of monomer(s) introduced into the reactor ri, i ranging from 1 to n,
the weight amount of all of the monomers entering the reactors r1 to rn representing 5% to 25% by weight of all the weight inputs of the process of the reactors r1 to rn,
the overall weight conversion Ci" in each reactor ri" is such that $$\frac{Cn}{n} - 0.2 < \frac{Ci''}{i''} < \frac{Cn}{n} + 0.2$$

where $$Ci'' = \frac{Pi''}{\sum_{1}^{n} Wi}$$

where Pi" is the weight of polymer formed at the output of the reactor ri", i" ranging from 1 to n−1,
Cn is the overall weight conversion in the reactor rn, with $$Cn = \frac{Pn}{\sum_{1}^{n} Wi}$$

where Pn is the weight of total polymer at the output of the reactor rn.

According to the process of the invention, it is possible to continuously synthesize a diene elastomer having a polydispersity index ranging from 1.1 to 2, preferably between 1.1 and 1.7, more preferentially ranging from 1.2 to 1.6.

DETAILED DESCRIPTION OF EXAMPLE EMBODIMENTS

The "expression "weight amount of all of the monomer(s) entering the reactors r1 to rn" is intended to mean the sum of the weight amount of monomer(s) introduced into the reactor r1 by the input solution and of the weight amounts of the monomer(s) reinjected into one or more of the reactors r2 to rn.

The term "polydispersity index" is intended to mean the weight-average molecular weight/number-average molecular weight ratio. The weight-average and number-average molecular weights are measured by size exclusion chromatography.

The process according to the invention makes it possible to control the polydispersity index of the polymer synthesized, through the controlling of the conversion in each reactor and through the number of reactors.

The conversion in each reactor is controlled by the temperature, the residence time, the amount of polar agent and the amount of monomer entering into each reactor.

The equilibration of the conversions in each reactor, as indicated above, makes it possible to minimize the polydispersity index.

By working at increasing temperature according to the invention, the propagation in the subsequent reactors is accelerated and the conversions are thus equilibrated.

The optional reinjection of a part of the monomers into one of the reactors from the second has an impact on the amount of monomers present in the reactor and the residence time in said reactor. Thus, these reinjections, which constitute an advantageous implementation of the process of the invention, also contribute to the equilibration of the conversions and, as explained above, to the control of the polydispersity index.

Advantageously, the very high purity of the monomers reinjected makes it possible to reduce the impact of the side reactions which have a tendency to widen the molecular distribution of the polymer formed.

The residence times and the temperatures are also chosen so as not to promote these side reactions.

Preferably, the reactors are equipped with an internal stirring mechanism.

Preferably, the number of reactors is equal to 2 or 3, preferably 2.

When the number of reactors is equal to 2, the process according to the invention has at least one of the following characteristics and preferably all of the following characteristics:
- a reinjection of a solution comprising monomer(s) is carried out in the reactor r2,
- the purity of the solution reinjected into the reactor r2 is such that the proportion of the number of dead chains in the output stream from the reactor r2 is less than 10%, preferentially less than 5% of the number of living chains initiated in the reactor r1,
- the temperature of the reactors r1 and r2 ranges from 20 to 150° C., preferably from 30° C. to 120° C., the temperature of the reactor r2 being greater than the temperature of the reactor r1,
- the weight amount of monomer(s) introduced into the reactor r1 is greater than 10% and less than 100% of the total weight amount of the monomers introduced into the reactors r1 and r2,
- the weight amount of monomer(s) reinjected into the reactor r2 is less than 90% by weight of the total weight of monomer(s) injected into the reactor r1 and reinjected into the reactor r2,
- the weight amount of all of the monomers entering the reactors r1 to rn representing 5% to 25% by weight of the sum of the weight inputs of the reactors r1 and r2,
- the overall weight conversion in the reactor 1 is equal to half the overall weight conversion in the reactor 2, +/−20%.

Preferably, the residence time in the reactor ri is between 1 and 60 minutes, preferably between 5 and 60, more preferably between 10 and 50 minutes. It is calculated in the following way:

$$\tau_i = \frac{V_i}{Q_{V_n}}$$

with:
Vi, reaction volume Ri, i ranging from 1 to n
QVn=flow rate by volume leaving the reactor n.

As explained above, a solution comprising monomer(s) can be reinjected into one or more of the reactors r2 to rn.

One or more of the reinjected solutions can contain a polar agent.

The purity of each reinjected solution is such that the proportion of the number of dead chains in the output stream from the reactor rn is, relative to the number of living chains initiated in the reactor r1, less than 30% by number, preferably less than 10% by number and more preferentially less than 5% by number.

The term "purity of a reinjected solution" is intended to mean the weight proportion of optional monomer(s), and of optional solvent and of optional polar agent, relative to the total weight of the reinjected solution.

Each reinjected solution contains purified solvent and/or purified monomers.

The constituent or each constituent of the reinjected solution(s) can be, before reinjection, purified independently by any purification means normally used to purify the constituents, for example by adsorption, liquid/liquid extraction, gas/liquid extraction, or distillation.

In particular, the solvent and/or the monomer(s) can be purified independently by adsorption, liquid/liquid extraction, gas/liquid extraction, or distillation.

The adsorption can be carried out on zeolite or on alumina.

The liquid/liquid extraction can be carried out by means of sodium hydroxide.

The gas/liquid extraction can be carried out by means of a stream of air or nitrogen.

The distillation can be a single-stage distillation without reflux (or flash distillation) or a column distillation optionally under vacuum.

The flash is carried out by means of an evaporation compartment. The column distillation is carried out by means of a distillation column.

Regardless of the purification process chosen for each constituent, the purified phase is used to constitute the stream to be reinjected.

According to one embodiment, the residues of the purification process(es) for the or for each constituent are reinjected into the input solution feeding the first reactor. These residues consist of the monomers and/or the solvent with a high concentration of impurities. The residues can then either constitute an extra contribution of monomer and/or of solvent to the input solution, or can constitute the sole source of monomer and/or of solvent of the input solution. This embodiment makes it possible to limit the loss of material in the case of reinjection.

The term "diene elastomer" should be understood, in a known way, as meaning an (one or more is understood) elastomer resulting at least in part (i.e., a homopolymer or a copolymer) from diene monomers (monomers bearing two conjugated or non-conjugated carbon-carbon double bonds). More particularly, diene elastomer is understood as meaning any homopolymer obtained by polymerization of a conjugated diene monomer having from 4 to 12 carbon atoms or any copolymer obtained by copolymerization of one or more conjugated dienes with one another or with one or more vinylaromatic monomers having from 8 to 20 carbon atoms. In the case of copolymers, the latter contain from 20% to 99% by weight of diene units and from 1% to 80% by weight of vinylaromatic units.

The following in particular are suitable as conjugated dienes which can be used in the process in accordance with the invention: 1,3-butadiene, 2-methyl-1,3-butadiene, 2,3-di($C_1$ to $C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene and 2,4-hexadiene, etc.

The following in particular are suitable as vinylaromatic monomers: styrene, ortho-, meta- or para-methylstyrene, the "vinyltoluene" commercial mixture, para-(tert-butyl)styrene, methoxystyrenes, vinylmesitylene, divinylbenzene and vinylnaphthalene, etc.

The diene elastomer is preferably selected from the group of highly unsaturated diene elastomers consisting of polybutadienes (BRs), synthetic polyisoprenes (IRs), butadiene copolymers, in particular copolymers of butadiene and of a vinylaromatic monomer, isoprene copolymers and the mixtures of these elastomers. Such copolymers are more particularly butadiene/styrene copolymers (SBRs), isoprene/butadiene copolymers (BIRs), isoprene/styrene copolymers (SIRs) and isoprene/butadiene/styrene copolymers (SBIRs). Among these copolymers, butadiene/styrene copolymers (SBRs) are particularly preferred.

The diene elastomer is generally prepared by anionic polymerization in the presence of a polymerization initiator. The polymerization initiator is included in the input solution.

Use may be made, as polymerization initiator, of any known monofunctional anionic initiator. However, an initiator comprising an alkali metal, such as lithium, is preferably used.

Use may be made, as polymerization initiator, of any known monofunctional anionic initiator. However, an initiator comprising an alkali metal, such as lithium, is preferably used. Those comprising a carbon-lithium bond are suitable in particular as organolithium initiators. Representative compounds are aliphatic organolithium compounds, such as ethyllithium, n-butyllithium (n-BuLi), isobutyllithium, etc.

The polymerization is carried out in the presence of a solvent included in the input solution.

The solvent used in the process according to the invention is preferably an inert hydrocarbon-based solvent which can, for example, be an aliphatic or alicyclic hydrocarbon such as pentane, hexane, heptane, isooctane, cyclohexane or methylcyclohexane, or an aromatic hydrocarbon, such as benzene, toluene or xylene.

As explained above, the input solution, and also optionally one or more of the reinjected solutions, used in the process according to the invention comprise(s) a polar agent.

By way of chelating polar agents that can be used in the process in accordance with the invention, agents comprising at least one tertiary amine function or at least one ether function and preferentially agents of tetrahydrofurfuryl ethyl ether or tetramethyl ethylenediamine type in particular are suitable.

According to a first particular embodiment, the output stream which is from the reactor n and which contains the living chains is brought into contact with one or more agents for stopping the polymerization as known per se, injected into the process continuously.

In this first embodiment, the living diene elastomer included in the output stream from the reactor n can be reacted with, in addition, one or more functionalizing, coupling or star-branching agents, which can act as an additional agent for stopping the polymerization. The particular feature of these additional agents is that they can either interact with a reinforcing filler (this is the case with functionalizing agents, coupling agents and certain star-branching agents) or confer a given structure on the polymer (this is the case with certain star-branching or coupling agents).

According to a second particular embodiment, the living diene elastomer included in the output stream from the reactor n is reacted with one or more functionalizing, coupling or star-branching agents. These agents then also act as stopping agent.

Regardless of the embodiment, any agent known per se can be envisaged as functionalizing, coupling or star-branching agent.

The abovementioned characteristics of the present invention, and also others, will be better understood on reading the following description of several exemplary embodiments of the invention, given by way of illustration and without limitation.

Measurements and Tests Used

Glass Transition Temperature

In these examples, the glass transition temperatures (Tg) of the elastomers are determined using a differential scanning calorimeter.

Polydispersity Index

The polydispersity index of the polymer is determined by means of SEC (size exclusion chromatography).

The SEC (Size Exclusion Chromatography) technique makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the distribution of the molar masses of a polymer. The various number-average molar masses (Mn) and weight-average molar masses (Mw) can be determined from commercial standards and the polydispersity index (PI=Mw/Mn) can be calculated via a "Moore" calibration.

There is no specific treatment of the polymer sample before analysis. The latter is simply dissolved in the elution solvent at a concentration of approximately 1 g·l$^{-1}$. The solution is then filtered through a filter with a porosity of 0.45 µm before injection.

The apparatus used is a Waters Alliance chromatographic line. The elution solvent is either tetrahydrofuran or tetrahydrofuran+1 vol % of diisopropylamine+1 vol % of triethylamine, the flow rate is 1 ml·min$^{-1}$, the temperature of the system is 35° C. and the analysis time is 30 min. A set of two Waters columns with the Styragel HT6E trade name is used. The volume of the solution of the polymer sample injected is 100 µl. The detector is a Waters 2410 differential refractometer and the software for making use of the chromatographic data is the Waters Empower system.

The calculated average molar masses are relative to a calibration curve produced for SBRs having the following microstructure: 25% by weight of units of styrene type, 23% by weight of units of 1,2-type and 50% by weight of units of trans-1,4-type.

Conversion

The conversions are measured by weighing dry extract of the solution containing the polymer. In this method, solution containing the polymer is sampled at the reactor output. This solution is introduced into a pre-tared punnet. The weight of solution is thus weighed.

The sample is dried at 140° C., under a reduced pressure of 200 mmHg for 15 minutes. The punnet is then placed in a desiccator containing silica gel, for two minutes. Weighing of the punnet then makes it possible to determine the weight of polymer of the sample taken. It is then possible, via the monomer concentration, to work back to the conversion at the output of the reactor.

$$C = \frac{\frac{W_{dry\ extract}}{W_{sample}}}{\frac{\sum_1^n Wi}{\sum_1^n Qi}} \cdot 100$$

with $\Sigma_1^n Wi$ which represents the sum of all the weight inputs of monomers in the total process (reactors 1 to n)
and $\Sigma_1^n Qi$ which represents the sum of all the weight inputs in the total process (reactors 1 to n) (Solvent, monomers, catalysts, etc. . . . ),
the ratio $$\frac{\sum_1^n Wi}{\sum_1^n Qi}$$

corresponding to the % by weight of monomers

Elastomer Microstructure

The microstructure of the elastomers is characterized by the near-infrared (NIR) spectroscopy technique.

Near-infrared spectroscopy (NIR) is used to quantitatively determine the content by weight of styrene in the elastomer and also its microstructure (relative distribution of the 1,2-, trans-1,4- and cis-1,4-butadiene units). The principle of the method is based on the Beer-Lambert law generalized for a multicomponent system. As the method is indirect, it involves a multivariate calibration [Vilmin, F., Dussap, C. and Coste, N., Applied Spectroscopy, 2006, 60, 619-29] carried out using standard elastomers having a composition determined by $^{13}$C NMR. The styrene content and the microstructure are then calculated from the NIR spectrum of an elastomer film having a thickness of approximately 730 µm. The spectrum is acquired in transmission mode between 4000 and 6200 cm$^{-1}$ with a resolution of 2 cm$^{-1}$ using a Brüker Tensor 37 Fourier-transform near-infrared spectrometer equipped with an InGaAs detector cooled by the Peltier effect.

Content of living chains in the Elastomer at Output from the Reactors

In the examples, the solution of living polymer at the output from the polymerization reactors is continuously brought into contact with the DEAB (diethylaminobenzophenone) functionalizing agent in excess with a contact time sufficient for total reaction of all the living chains with the functionalizing agent. The determination of the content of grafted DEAB (function content in the examples) is carried out by NMR analysis. This determination is carried out relative to the amount of elastomer. In this way, the results obtained can be expressed as mol %, as meq/kg of elastomer or as phr (gram percent of elastomer).

The samples (approximately 25 mg of elastomer) are dissolved in approximately 1 ml of carbon disulfide (CS2). 100 µl of deuterated cyclohexane are added for the Lock signal.

The spectra are acquired on a Bruker Avance 500 MHz spectrometer fitted with a Bruker "broad band" BBI z-grad 5 mm probe.

The quantitative $^1$H NMR experiment uses a 30° single pulse sequence and a repetition time of 5 seconds between each acquisition. 256 accumulations are carried out at ambient temperature.

The $^1$H NMR signals of the 8 protons quantified (protons bound to the carbons identified 1 to 4 in FIG. 1) of the grafted DEABs corresponds to an unresolved peak at the chemical shift of 3.2 ppm.

The edited HSQC $^1$J $^1$H/$^{13}$C 2D NMR correlation spectrum makes it possible to verify the nature of the unit grafted by means of the chemical shifts of the carbon atoms and protons. The signal of carbons 1 to 4 has a chemical shift at 44.4 ppm.

The $^1$H NMR spectrum makes it possible to quantify the grafted DEAB units by integration of the signal unresolved peaks described above: H1, H2 for the dehydrated DEAB form and H3, H4 for the DEAB carbinol form.

The grafted diethylaminobenzophenone, dehydrated and carbinol forms, has the formula below:

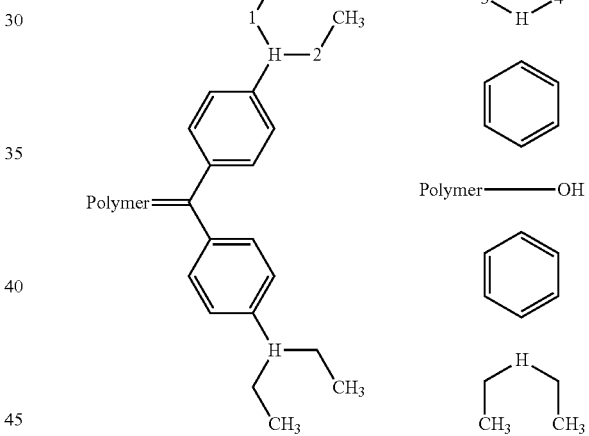

The chemical shifts are calibrated relative to the protonated impurity of the carbon disulfide ppm 1H at 7.18 ppm referenced on the TMS (δ ppm 1H at 0 ppm) and ppm 13C at 192 ppm referenced on the TMS (δ ppm 13C at 0 ppm).

The simple-pulse $^1$D $^1$H NMR spectrum makes it possible to quantify the units of the polymer by integration of the characteristic signal unresolved peaks. Example, for an SBR (styrene butadiene rubber), the unresolved peaks in question for the calculation are 5H (protons) styrene between 7.4 ppm and 6.0 ppm, 2H PB (polybutadiene) 1-4+1H PB1-2 between 5.8 ppm and 4.9 ppm and 2H PB1-2 between 4.9 ppm and 4.3 ppm.

Thus, as a function of the content of living chains at the output from the polymerization reactors, it is possible to determine by difference the degree of dead chains in the elastomer.

EXAMPLES

Methylcyclohexane, butadiene, styrene and tetrahydrofurfuryl ethyl ether are continuously introduced, according to the proportions described in each example, into a pilot facility for continuous polymerization containing several stirred continuous reactors, assumed to be perfectly stirred according to those skilled in the art. n-Butyllithium (n-BuLi) is introduced in a sufficient amount in order to neutralize the protic impurities introduced by the different constituents present in the line inlet. The samples for the characterization are taken after stabilization of the process. The stability is taken to be a period of time which is the sum of 3 residence times per polymerization reactor. For example, for 3 reactors i in series:

$$T_{lmb} = 3 \cdot \sum_{i=1}^{3} Tds_i$$

For examples 1 to 3, a purification of the reinjected solution of butadiene and/or of solvent is carried out continuously by means of an alumina column. This column is packed with a fixed bed of aluminas of Axsorb 920 type.

The minimum fixed-bed L/D ratio is 4.

The column diameter/minimum mean alumina particle diameter ratio is 10.

The empty-tank Reynolds number is greater than 2.

The minimum residence time of the fluid in the packed fixed bed is 5 minutes.

The column is maintained under the following conditions:
Temperature=10° C.
Pressure=5 bar.

The residence times and the concentrations indicated as examples are calculated from the flow rates of the various constituents entering the polymerization process.

Example 1

A synthesis of butadiene/styrene polymer is carried out according to a comparative process using 9 stirred reactors, assumed to be perfectly stirred in series.

The reinjected butadiene is purified by alumina column.

The operating conditions are specified in Table 1

TABLE 1

| Operating conditions | Value | Unit | Reactor |
|---|---|---|---|
| Number of reactors | 9 | — | — |
| Volume of reactors | 1.83 | | 1 |
| | 2.411 | | 2 |
| | 2.411 | | 3 |
| | 2.411 | | 4 |
| | 2.411 | | 5 |
| | 2.411 | | 6 |
| | 4.441 | | 7 |
| | 4.441 | | 8 |
| | 4.441 | | 9 |
| % Styrene (1) | 45 | % | — |
| Wt % monomers (2) | 12.5 | % | — |
| Polar agent (tetrahydrofurfuryl ethyl ether) | $8.2 \times 10^{-7}$ | Mol/m³ | 9 |
| Active initiator (n-butyllithium) | $5.1 \times 10^{-7}$ | Mol/m³ | 9 |
| Residence time | 6.53 | Min | 9 |
| Temperature | 60 | ° C. | 1, 2, 3, 4, 5, 6, 7, 8, 9 |

TABLE 1-continued

| Operating conditions | Value | Unit | Reactor |
|---|---|---|---|
| Reinjection butadiene (3) | 8 | % | 7 |
| Overall weight conversion (4) | 8 | % | 1 |
| | 27.8 | % | 3 |
| | 46.7 | % | 6 |
| | 69.3 | % | 9 |

(1) by weight relative to the sum of all the weight inputs of monomers of the process
(2) by weight relative to the sum of all the weight inputs of the process
(3) by weight relative to the total weight of the monomers injected into all of the reactors
(4) overall weight conversion in the reactor The characteristics of the polymer obtained at the output from reactor 9 are given in Table 2.

TABLE 2

| | | |
|---|---|---|
| Vinyl content (5) | 23.4 | % |
| Styrene content (6) | 28.8 | % |
| Tg | −46.2 | ° C. |
| PI | 1.24 | — |
| Mn | 126.1 | kg/mol |
| Amount of functions | 7.41 | mmol/kg |
| Living polymer content (7) | 96.9 | % |

(5) by weight of the total weight of the butadiene units introduced into all of the reactors
(6) by weight of the total weight of the monomers introduced into all of the reactors
(7) Molar ratio of the amount of functions determined by NMR to the amount of active initiator introduced.

Example 2

A synthesis of styrene/butadiene polymer is carried out according to a process according to the invention using 6 stirred reactors, assumed to be perfectly stirred in series.

The reinjected butadiene is purified by alumina column. The operating conditions are specified in Table 3.

TABLE 3

| Operating conditions | Value | Unit | Reactor |
|---|---|---|---|
| Number of reactors | 6 | — | — |
| Volume of reactors | 2.411 | L | 1 |
| | 2.411 | | 2 |
| | 2.411 | | 3 |
| | 4.441 | | 4 |
| | 4.441 | | 5 |
| | 4.441 | | 6 |
| % Styrene (1) | 45 | % | |
| Wt % monomers (2) | 12.5 | % | — |
| Polar agent (tetrahydrofurfuryl ethyl ether) | $8.2 \times 10^{-7}$ | Mol/m³ | 6 |
| Active initiator (n-butyllithium) | $5.1 \times 10^{-7}$ | Mol/m³ | 6 |
| Residence time | 9.49 | Min | 6 |
| Temperature | 55 | ° C. | 1 |
| | 55 | | 2 |
| | 55 | | 3 |
| | 65 | | 4 |
| | 65 | | 5 |
| | 65 | | 6 |
| Reinjection butadiene (3) | 8 | % | 4 |
| Overall weight conversion (4) | 9.8 | % | 1 |
| | 33.4 | % | 3 |
| | 64.8 | % | 6 |

(1) by weight relative to the sum of all the weight inputs of monomers of the process
(2) by weight relative to the sum of all the weight inputs of the process
(3) by weight relative to the total weight of the monomers injected into all of the reactors
(4) overall weight conversion in the reactor The characteristics of the polymer obtained at the output from reactor 6 are given in Table 4.

TABLE 4

| | | |
|---|---|---|
| Vinyl content (5) | 23.5 | % |
| Styrene content (6) | 29.1 | % |
| Tg | −45.7 | ° C. |
| Mn | 122.2 | kg/mol |
| PI | 1.27 | — |
| Amount of functions | 7.89 | mmol/kg |
| Living polymer content (7) | 95.4 | % |

(5) by weight of the total weight of the butadiene units introduced into all of the reactors
(6) by weight of the total weight of all of the monomers introduced into all of the reactors
(7) Molar ratio of the amount of functions determined by NMR to the amount of active initiator introduced.

Thus, this example shows that it is possible to synthesize a functional polymer with a reduced polydispersity index, using a polythermal process comprising 6 reactors in series.

Thus, this example shows that it is possible to synthesize, using a polythermal process comprising 6 reactors in series, a functional polymer with a reduced polydispersity index equivalent to that obtained by the synthesis with 9 reactors of Example 1, which is however, a priori, more effective for reducing the PI because of the higher number of reactors.

The temperature gradient makes it possible to maintain a reduced polydispersity index by decreasing the number of reactors. This has a strong impact on the cost of the process and therefore on the economic aspect of the industrialization thereof.

Example 3

The object of this example is to compare two syntheses of a functionalized butadiene/styrene polymer carried out by means of two stirred polymerization reactors, assumed to be perfectly stirred polymerization reactors, in series, and of a functionalization reactor.

During the first synthesis of functionalized polymer, the polymerization does not comprise any reinjection of monomer into the second reactor.

The second synthesis of functionalized polymer is carried out with reinjection of monomers according to a process according to the invention. The solvent and the butadiene that are reinjected into the second reactor during the polymerization are purified on alumina columns.

The operating conditions are specified in Table 5

TABLE 5

| Operating conditions | Value synthesis 1 | Value synthesis 2 | Unit | Reactor |
|---|---|---|---|---|
| Number of reactors | 2 | 2 | — | — |
| Volume of reactors | 14 | 14 | L | 1 |
| | 14 | 14 | | 2 |
| % Styrene (1) | 40 | 40 | % | — |
| Wt % monomers (2) | 13 | 13 | % | 1 |
| Polar agent (tetrahydrofurfuryl ethyl ether) | $5.8 \times 10^{-7}$ | $5.8 \cdot 10^{-7}$ | Mol/m³ | 2 |
| Active initiator (n-butyllithium) | $8.5 \times 10^{-7}$ | $8.5 \times 10^{-7}$ | Mol/m³ | 2 |
| Residence time | 30 | 30 | Min | 2 |
| Temperature | 50 | 50 | ° C. | 1 |
| Temperature | 60 | 60 | ° C. | 2 |
| Reinjection solvent (3) | 0 | 10 | % | 2 |
| Reinjection butadiene (4) | 0 | 50 | % | 2 |

TABLE 5-continued

| Operating conditions | Value synthesis 1 | Value synthesis 2 | Unit | Reactor |
|---|---|---|---|---|
| Weight conversion of monomers (5) | 76.2 | 56.4 | % | 1 |
| | 96.3 | 93.3 | % | 2 |

(1) by weight relative to the sum of all the weight inputs of monomers of the process
(2) by weight relative to the sum of all the weight inputs of the process
(3) by weight relative to the sum of all the inputs of solvent of the process
(4) by weight relative to the total weight of the monomers injected into all of the reactors
(5) overall weight conversion in the reactor The characteristics of the polymers obtained at the output from reactor 2 are given in Table 6.

TABLE 6

| | Synthesis 1 | Synthesis 2 | Unit |
|---|---|---|---|
| Vinyl content (6) | 49.3 | 48.8 | % |
| Styrene content (7) | 39.1 | 39.8 | % |
| Tg | −14.4 | −13.9 | ° C. |
| Mn | 111.5 | 112.2 | kg/mol |
| PI | 1.67 | 1.52 | — |
| Function content | 8.95 | 8.81 | mmol/kg |
| Living polymer content (8) | 97.3 | 95.7 | % |

(6) by weight of the total weight of the butadiene units introduced into all of the reactors
(7) by weight of the total weight of the monomers introduced into all of the reactors
(8) Molar ratio of the amount of functions quantitatively determined by NMR to the amount of active initiator introduced.

The synthesis 2 to the invention exhibits equilibrated conversions between reactor 1 and reactor 2.

In this way, the functionalized polymer synthesized by means of synthesis 2 with reinjection of monomers has a lower PI than that of synthesis 1 carried out without reinjection of monomers.

Example 4

The object of this example is to quantify the impact of the purification of butadiene on the living polymer content at the polymerization output.

The first synthesis comprises a reinjection of an unpurified butadiene during the polymerization. The unpurified butadiene contains, as major impurity, tert-butyl catechol (TBC) in an amount of 300 ppm.

The second synthesis comprises, during the polymerization, a reinjection of butadiene that has been flash-purified under the following temperature and pressure conditions:
P=1.1 bar
T=50° C.

The solvent reinjected in the two syntheses is purified by alumina column as described above for Examples 1 to 3. The operating conditions are specified in Table 7

TABLE 7

| Operating conditions | Value synthesis 1 | Value synthesis 2 | Unit | Reactor |
|---|---|---|---|---|
| Number of reactors | 2 | 2 | — | — |
| Volume of reactors | 32.5 | 32.5 | L | 1 |
| | 32.5 | 32.5 | | 2 |
| % Styrene (1) | 35 | 35 | % | — |
| Wt % monomers (2) | 13 | 13 | % | 1 |
| Polar agent (tetrahydrofurfuryl ethyl ether) | $1.9 \times 10^{-7}$ | $1.9 \times 10^{-7}$ | Mol/m³ | 2 |
| Active initiator (n-butyllithium) | $7.6 \times 10^{-7}$ | $7.6 \times 10^{-7}$ | Mol/m³ | 2 |
| Residence time | 30 | 30 | Min | 2 |
| Temperature | 40 | 40 | ° C. | 1 |
| Temperature | 70 | 70 | ° C. | 2 |

TABLE 7-continued

| Operating conditions | Value synthesis 1 | Value synthesis 2 | Unit | Reactor |
|---|---|---|---|---|
| Reinjection solvent (3) | 10 | 10 | % | 2 |
| Reinjection butadiene (4) | 19.5 | 19.5 | % | 2 |
| Weight conversion of monomers (5) | 38.5 | 38.0 | % | 1 |
|  | 85.9 | 86.1 | % | 2 |

(1) by weight relative to the sum of all the weight inputs of monomers of the process
(2) by weight relative to the sum of all the weight inputs of the process
(3) by weight relative to the sum of all the inputs of solvent of the process
(4) by weight relative to the total weight of the monomer is injected into all of the reactors
(5) overall weight conversion in the reactor The characteristics of the polymers obtained at the output from reactor 2 are given in Table 8.

TABLE 8

|  | Synthesis 1 | Synthesis 2 | Unit |
|---|---|---|---|
| Vinyl content (6) | 36.8 | 37.0 | % |
| Styrene content (7) | 29.2 | 29.8 | % |
| Tg | −36.8 | −35.8 | ° C. |
| Mn | 110.5 | 110.2 | kg/mol |
| PI | 1.51 | 1.51 | — |
| Function content | 8.05 | 8.81 | mmol/kg |
| Living polymer content (8) | 90.1 | 98.8 | % |

(6) by weight of the total weight of the butadiene units introduced into all of the reactors
(7) by weight of the total weight of the monomers introduced into all of the reactors
(8) Molar ratio of the amount of functions determined by NMR to amount of active initiator introduced.

It can thus be seen that the purification of the butadiene has a strong impact on the living polymer content measured by the method described above.

The invention claimed is:

1. A process for the continuous synthesis of a diene elastomer by means of n reactors r1 to rn, n being the number of reactors, equipped with an internal stirring system, and arranged in series, n ranging from 2 to 15, the reactor r1 being fed by an input solution comprising a solvent, one or more monomers, an anionic polymerization initiator and a polar agent, one or more of the reactor(s) r2 to rn also being fed by reinjection of a purified solution comprising solvent and/or monomer(s), the purity of the reinjected solution fed to one or more of the reactors being such that the proportion of the number of dead chains in an output stream from the reactor rn is less than 30%, of the number of living chains initiated in the reactor r1, the temperature of each reactor ranging from 20 to 150° C., and being greater than or equal to the temperature of the reactor which immediately precedes it, the temperature of the reactor rn being greater than the temperature of the reactor r1, the weight amount $W_1$ of monomer(s) introduced into the reactor r1 being such that $$0.1 < \frac{W1}{\sum_{i=1}^{n} Wi} \leq 1$$

the weight amount We of monomer(s) reinjected into the reactor ri', when $W_{i'} \neq 0$, i' ranging from 2 to n, being such that $$0 \leq \frac{Wi'}{\sum_{1}^{n} Wi} < 0.9$$

and such that Wi' represents from 5% to 100% by weight of the weight of the solution reinjected into the reactor ri', when $W_{i'} \neq 0$, where Wi is the weight amount of monomer(s) introduced into the reactor ri, i ranging from 1 to n, the weight amount of all of the monomers entering the reactors r1 to rn representing 5% to 25% by weight of the sum of the total weight inputs of the reactors r1 to rn, the overall weight conversion Ci" in each reactor ri" being such that $$\frac{Cn}{n} - 0.2 < \frac{Ci''}{i''} < \frac{Cn}{n} + 0.2$$

where $$Ci'' = \frac{Pi''}{\sum_{1}^{n} Wi}$$

where Pi" is the weight of polymer formed at the output of the reactor ri", i" ranging from 1 to n−1, Cn is the overall weight conversion in the reactor rn, with $$Cn = \frac{Pn}{\sum_{1}^{n} Wi}$$

where Pn is the weight of total polymer at the output of the reactor rn, the diene elastomer obtained having a polydispersity index ranging from 1.1 to 2.

2. A process according to claim 1, wherein n ranges from 2 to 3.

3. A process according to claim 1, wherein the reinjected solution fed to one or more of the reactors contains the polar agent.

4. A process A process according to claim 1, wherein at least one constituent of the reinjected solution fed to one or more of the reactors is, before reinjection, purified independently by adsorption, liquid/liquid extraction, gas/liquid extraction, or distillation.

5. A process according to claim 4, wherein the chemical adsorption is carried out on zeolite or on alumina.

6. A process according to claim 4, wherein the chemical washing is washing by liquid/liquid extraction by means of sodium hydroxide.

7. A process according to claim 4, wherein the gas/liquid extraction is carried out by means of a stream of air or nitrogen.

8. A process according to claim 4, wherein the purification is carried out by distillation.

9. A process according to claim 8, wherein the distillation is a single-stage distillation without reflux or a column distillation.

10. A process according to claim 4, wherein residues of the purification process(es) for the at least one constituent are reinjected into the input solution feeding the first reactor.

11. A process according to claim 10, wherein residues of the purification process(es) of the at least one constituent constitute an extra contribution of monomer and/or of solvent to the input solution.

12. A process according to claim 10, wherein residues of the process(es) for purifying the at least one constitute the sole source of monomer and/or of solvent of the input solution.

13. A process according to claim 1, wherein the residence time in the reactor ri, i ranging from 1 to n, is between 1 and 60 minutes.

14. A process according to claim 1, wherein the diene elastomer is a copolymer of butadiene and of a vinyl aromatic monomer.

15. A process according to claim 1, wherein the polymerization initiator is chosen from ethyllithium, n-butyllithium and isobutyllithium.

16. A process according to claim 1, wherein the output stream which is from the reactor rn and which contains the living chains is brought into contact with one or more agents for stopping polymerization, injected into the process continuously.

17. A process according to claim 1, wherein the living diene elastomer included in the output stream from the reactor n is reacted with one or more agents for stopping polymerization and one or more functionalizing, coupling or star-branching agents.

18. A process according to claim 1, wherein the living diene elastomer included in the output stream from the reactor n is reacted with one or more functionalizing, coupling or star-branching agents.

* * * * *